UNITED STATES PATENT OFFICE.

OSCAR A. ENHOLM, OF NEW YORK, N. Y., ASSIGNOR, BY DIRECT AND MESNE ASSIGNMENTS, TO THE ENHOLM ELECTRICAL CONSTRUCTION COMPANY, OF SAME PLACE.

COMPOSITION FOR CELLS OR RETAINING-VESSELS.

SPECIFICATION forming part of Letters Patent No. 438,313, dated October 14, 1890.

Application filed March 28, 1890. Serial No. 345,664. (No specimens.)

*To all whom it may concern:*

Be it known that I, OSCAR A. ENHOLM, a citizen of the United States, and a resident of New York city, county and State of New York, have invented a new and useful Improvement in Composition for Cells or Retaining-Vessels, of which the following is a specification.

The object of my invention is to provide a light, strong, liquid-tight and thoroughly acid-resisting vessel.

The invention consists in the novel details of improvement that will be more fully hereinafter set forth, and then pointed out in the claim.

In carrying out my invention I mix asbestus (in fibers of woven cloth) with mineral wax and gutta-percha, which forms a plastic material. A good proportion of parts I find to be about as follows: asbestus fibers, forty parts; mineral wax, thirty parts; gutta-percha, thirty parts; but the proportions may be varied as desired.

I prefer to first melt together the mineral wax and gutta-percha, stir the mass to properly mix it, then add the asbestus, and then thoroughly mix all together while heated. The above mixture is or may be then formed into the desired shape by pressing it in molds or otherwise while hot and then allowing it to cool. I may, if I desire, add to the mixture a hardening medium—such as shellac, rosin, or the like; or I may add powdered glass, or I may apply the latter to the surface of the mixture before it hardens. The powdered glass gives a hard surface to the finished vessel.

Instead of combining loose asbestus fibers with the mixture of mineral wax and gutta-percha, I may apply the above mixture to woven asbestus-cloth by saturating or permeating said cloth with said mixture while it is in a heated state.

I may form the desired vessel with the cloth treated as above by placing layers of said cloth together in any desired shape while the material is warm and plastic, and when it cools the layers will adhere closely together. For a more detailed description of one manner of making a vessel of layers of the cloth treated as above, I refer to an application for a patent for cells or retaining-vessels filed by me March 21, 1890, Serial No. 344,700.

A vessel composed of my improved composition will be perfectly water-tight, will thoroughly withstand the action of chemicals, and will be strong and rigid. The fibers of the asbestus, in connection with the other ingredients, make the vessel extremely strong.

I do not herein claim a composition containing a hardening medium, as that is the subject of an application filed by me February 19, 1890, Serial No. 341,033.

Having now described my invention, what I claim is—

The composition herein described, consisting of asbestus, mineral wax, and gutta-percha, substantially as described.

In testimony that I claim the foregoing as my invention I have signed my name, in presence of two witnesses, this 27th day of March, 1890.

OSCAR A. ENHOLM.

Witnesses:
JULIUS M. HEYMAN,
T. F. BOURNE.